US011021636B2

(12) United States Patent
Turner et al.

(10) Patent No.: US 11,021,636 B2
(45) Date of Patent: *Jun. 1, 2021

(54) ADHESIVE COMPOSITION FOR ABSORBENT ARTICLES

(71) Applicant: The Procter & Gamble Company, Cincinnati, OH (US)

(72) Inventors: Robert Haines Turner, Cincinnati, OH (US); Torsten Lindner, Kronberg (DE); Matthias Morand, Bad Soden (DE); Benjamin John Kutay, Cincinnati, OH (US); Holger Beruda, Schwalbach (DE); Ekaterina Ponomarenko, Mechernich (DE); William L. Bunnelle, Ham Lake, MN (US); Jon Fagerness, Coon Rapids, MN (US); Nick Fowler, Odessa, TX (US); Bill Turner, Odessa, TX (US); Andres Sustic, Odessa, TX (US); Enrico Buenacosa, Odessa, TX (US); Steve Oetting, Odessa, TX (US); Steve McHaney, Odessa, TX (US); J. J. DeCair, Odessa, TX (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/387,689

(22) Filed: Apr. 18, 2019

(65) Prior Publication Data

US 2019/0322909 A1    Oct. 24, 2019

Related U.S. Application Data

(60) Provisional application No. 62/660,353, filed on Apr. 20, 2018.

(51) Int. Cl.
| | | |
|---|---|---|
| *C08L 23/12* | (2006.01) | |
| *C09J 123/20* | (2006.01) | |
| *C09J 123/14* | (2006.01) | |
| *C08L 23/20* | (2006.01) | |
| *C08L 23/16* | (2006.01) | |
| *C08L 23/14* | (2006.01) | |

(52) U.S. Cl.
CPC ............. *C09J 123/20* (2013.01); *C08L 23/12* (2013.01); *C08L 23/14* (2013.01); *C08L 23/16* (2013.01); *C08L 23/20* (2013.01); *C09J 123/142* (2013.01)

(58) Field of Classification Search
CPC ....... C09J 123/20; C09J 123/14; C08L 23/16; C08L 23/12; C08L 23/14; C08L 23/20
See application file for complete search history.

(56) References Cited

U.S. PATENT DOCUMENTS

| | | | |
|---|---|---|---|
| 5,302,675 | A | 4/1994 | Sustic et al. |
| 5,723,546 | A | 3/1998 | Sustic |
| 8,865,824 | B2 | 10/2014 | Bunnelle |
| 9,139,755 | B2 | 9/2015 | Bunnelle |
| 9,187,679 | B2 | 11/2015 | Bunnelle |
| 9,241,843 | B2 | 1/2016 | Bunnelle et al. |
| 9,555,152 | B2 | 1/2017 | Bunnelle |
| 9,556,366 | B2 | 1/2017 | Bunnelle |
| 9,670,388 | B2 | 6/2017 | Bunnelle |
| 9,695,342 | B2 | 7/2017 | Sustic et al. |
| 9,937,277 | B2 | 4/2018 | Bunnelle |
| 9,943,623 | B2 | 4/2018 | Bunnelle |
| 9,994,742 | B2 | 6/2018 | Bunnelle |
| 2011/0054117 | A1 | 3/2011 | Hall |
| 2013/0060215 | A1 | 3/2013 | Knutson et al. |
| 2014/0147669 | A1 | 5/2014 | Thatcher et al. |
| 2015/0080511 | A1 | 3/2015 | Knutson et al. |
| 2015/0173958 | A1 | 6/2015 | Bunnelle |
| 2015/0174286 | A1 | 6/2015 | Bunnelle |
| 2017/0165125 | A1 | 6/2017 | Turner |
| 2017/0165130 | A1 | 6/2017 | Turner |
| 2017/0165133 | A1 | 6/2017 | Turner |
| 2017/0165396 | A1 | 6/2017 | Turner |
| 2017/0209616 | A1 | 7/2017 | Turner |
| 2018/0002579 | A1 | 1/2018 | Hu et al. |
| 2018/0078425 | A1 | 3/2018 | Bunnelle |
| 2018/0237664 | A1 | 8/2018 | Bunnelle |
| 2019/0321242 | A1* | 10/2019 | Turner et al. ......... A61F 13/539 |

FOREIGN PATENT DOCUMENTS

WO    WO 2016208701    12/2016

OTHER PUBLICATIONS

International Search Report and Written Opinion, PCT/US2019/028019 dated Jul. 19, 2019.

* cited by examiner

*Primary Examiner* — Douglas J Mc Ginty
(74) *Attorney, Agent, or Firm* — Daniel S. Albrecht; Richard L. Alexander

(57) ABSTRACT

Described herein is an adhesive composition including (a) from about 70 wt. % to about 90 wt. % of one or more copolymers, and (b) from about 10 wt. % to about 30 wt. % of one or more heterophase copolymers. The one or more copolymers include (i) from about 30 mole % to about 70 mole % of monomer units selected from the group consisting of ethylene, 1-butene, and mixtures thereof; and (ii) from about 30 mole % to about 70 mole % of propene monomer units. The adhesive composition is free of polyisobutylene. The adhesive composition has a viscosity of from about 2,000 mPa·s to about 11,500 mPa·s at 150° C. The one or more heterophase copolymers includes a first heterophase copolymer and a second heterophase copolymer.

20 Claims, No Drawings

ADHESIVE COMPOSITION FOR ABSORBENT ARTICLES

CROSS REFERENCE TO RELATED APPLICATION

This application claims the benefit, under 35 USC 119(e), to U.S. Provisional Patent Application No. 62/660,353 filed on Apr. 20, 2018, which is herein incorporated by reference in its entirety.

FIELD

Disclosed herein is an adhesive composition for absorbent articles and textile articles.

BACKGROUND

Adhesive compositions such as hot melt adhesive compositions are a type of adhesive that is applied in molten form onto parts to be adhesively bonded, before setting and solidifying upon cooling. Olefin-based hot melt adhesives require good bonding properties so that the adhesive can be bonded reliably to a substrate, but such bonding properties can make the adhesive difficult to process during manufacturing. In the course of production and application of the adhesive, equipment used for processing the adhesives and forming adhesive-bonded articles can become damaged or require constant maintenance due to cured adhesive residuals that accumulate on the equipment parts. These residuals can be disruptive on rollers, rotating parts such as shafts or rolls, and in parts which are intended to form the hot melt adhesives, such as extrusion dies, pressure rollers or laminating tools.

Common hot melt adhesives are made by combining polymer and additive components in a substantially uniform thermoplastic blend. Typical additives may include tackifiers, plasticizers, and/or waxes, for example. While such formulations generally work, they can be costly and their performance properties can be improved. For example, tackifiers, which can comprise up to 65% of an adhesive composition, can be expensive and difficult to source. Therefore, there is a continuing need for improved adhesive compositions that offer better performance, improved processability, and lower cost.

SUMMARY

Described herein is an adhesive composition comprising: (a) from about 70 wt. % to about 90 wt. % of one or more copolymers, wherein the one or more copolymers comprise (i) from about 30 mole % to about 70 mole % of monomer units selected from the group consisting of ethylene, 1-butene, and mixtures thereof; and (ii) from about 30 mole % to about 70 mole % of propene monomer units; (b) from about 10 wt. % to about 30 wt. % of one or more heterophase copolymers; wherein the adhesive composition is free of polyisobutylene; wherein the adhesive composition has a viscosity of from about 2,000 mPa·s to about 11,500 mPa·s at 150° C., as measured by the Viscosity Test Method; wherein the one or more heterophase copolymers comprises a first heterophase copolymer and a second heterophase copolymer; wherein the adhesive composition comprises from about 5 wt. % to about 15 wt. % of the first heterophase copolymer and from about 5 wt. % to about 15 wt. % of the second heterophase copolymer; and wherein the first heterophase copolymer has a higher Enthalpy of Fusion than the second heterophase copolymer, as measured by the Enthalpy of Fusion Test Method.

Also described herein is an adhesive composition comprising: (a) from about 50 wt. % to about 80 wt. % of one or more copolymers, wherein the one or more copolymers comprise (i) from about 30 mole % to about 70 mole % of monomer units selected from the group consisting of ethylene, 1-butene, and mixtures thereof; and (ii) from about 30 mole % to about 70 mole % of propene monomer units; (b) from about 20 wt. % to about 50 wt. % of one or more heterophase copolymers; wherein the adhesive composition is free of polyisobutylene; wherein the adhesive composition has a viscosity of from about 2,000 mPa·s to about 11,500 mPa·s at 150° C., as measured by the Viscosity Test Method; wherein the adhesive composition has an Enthalpy of Fusion of less than 15 J/g, as measured by the Enthalpy of Fusion Test Method; wherein the one or more copolymers comprises a first copolymer and a second copolymer, and wherein the adhesive composition comprises from about 40 wt. % to about 75 wt. % of the first copolymer and from about 5 wt. % to about 40 wt. % of the second copolymer.

Also described herein is an adhesive composition comprising: (a) from about 70 wt. % to about 90 wt. % of one or more copolymers, wherein the one or more copolymers comprise (i) from about 30 mole % to about 70 mole % of 1-butene monomer units; and (ii) from about 30 mole % to about 70 mole % of propene monomer units; (b) from about 10 wt. % to about 30 wt. % of one or more heterophase copolymers; wherein the adhesive composition is free of polyisobutylene; wherein the adhesive composition has a viscosity of from about 2,000 mPa·s to about 11,500 mPa·s at 150° C., as measured by the Viscosity Test Method; wherein the adhesive composition has an Enthalpy of Fusion of less than 15 J/g, according to the Enthalpy of Fusion Test Method; and wherein the one or more copolymers comprises a first copolymer and a second copolymer, and wherein the adhesive composition comprises from about 35 wt. % to about 80 wt. % of the first copolymer and from about 10 wt. % to about 35 wt. % of the second copolymer.

The one or more copolymers comprising (i) from about 30 mole % to about 70 mole % of 1-butene monomer units; and (ii) from about 30 mole % to about 70 mole % of propene monomer units may be in particular one or more amorphous copolymer(s).

DETAILED DESCRIPTION

The following definitions may be useful in understanding the present disclosure:

"Amorphous" refers herein to the substantial absence of crystallinity, in particular to polymers having an enthalpy of fusion of less than 20.0 J/g, as measured with the Enthalpy of Fusion Test Method described herein.

"Copolymer(s)" refers herein to polymer(s) formed by the polymerization of at least two different monomers. The term "copolymer" can include terpolymers, which contain three types of different monomers.

"Devoid of," "free of," and the like, as those terms are used herein, means that the adhesive composition does not have more than trace amounts of background levels of a given material, ingredient, or characteristic following these qualifiers; the amount of the material or ingredient does not cause harm or irritation that consumers typically associate with the material or ingredient; or the material or ingredient was not added to the adhesive composition intentionally. In some applications, "devoid of" and "free of" can mean there is no measurable amount of the material or ingredient. For example, the adhesive composition in some forms can contain no measurable amount of a tackifier.

"Heterophase" polymer refers herein to a polymer having an amorphous character and at least some substantial crystalline content that can provide cohesive strength in the cooled adhesive mass (in particular the polymer having an enthalpy of fusion of at least 20.0 J/g as measured with the Enthalpy of Fusion Test Method described herein). The crystalline content can be in the form of stereoregular blocks or sequences.

"Nonwoven" refers herein to a fibrous structure made from an assembly of continuous fibers, coextruded fibers, non-continuous fibers and combinations thereof, without weaving or knitting, by processes such as spunbonding, carding, meltblowing, airlaying, wetlaying, coforming, or other such processes known in the art for such purposes.

"Substrate" refers herein to a material which is primarily two-dimensional (i.e. in an XY plane) and whose thickness (in a Z direction) is relatively small (i.e. ⅒ or less) in comparison to the substrate's length (in an X direction) and width (in a Y direction). Non-limiting examples of substrates include a web, layer or layers or fibrous materials, nonwovens, films and foils such as polymeric films or metallic foils. These materials may be used alone or may comprise two or more layers joined together. As such, a web is a substrate.

As used herein, percentages are given as the weight of the component to the total weight of the material, unless otherwise indicated.

Values disclosed herein as ends of ranges are not to be understood as being strictly limited to the exact numerical values recited. Instead, unless otherwise specified, each numerical range is intended to mean both the recited values and any integers within the range. For example, a range disclosed as "1 to 10" is intended to mean "1, 2, 3, 4, 5, 6, 7, 8, 9, 10."

As used herein, the articles "a" and "an" when used herein, for example, "an anionic emulsifier" or "a fiber" is understood to mean one or more of the material that is claimed or described.

Adhesive Composition

Described herein is an adhesive composition comprising from about 70 wt. % to about 90 wt. % of one or more copolymers, alternatively from about 75 wt. % to about 85 wt. %, alternatively from about 50 wt. % to about 80 wt. %, alternatively from about 55 wt. % to about 75 wt. %, alternatively from about 60 wt. % to about 70 wt. %, alternatively from about 30 wt. % to about 55 wt. %, alternatively from about 35 wt. % to about 45 wt. %, and alternatively from about 40 wt. % to about 50 wt. % of one or more copolymers. The one or more copolymers may be an amorphous copolymer.

The one or more copolymers can comprise from about 30 wt. % to about 70 wt. %, alternatively from about 35 wt. % to about 65 wt. %, alternatively from about 40 wt. % to about 60 wt. %, alternatively from about 40 wt. % to about 55 wt. %, alternatively from about 45 wt. % to about 55 wt. %, alternatively from about 44 wt. % to about 46 wt. %, and alternatively from about 48 wt. % to about 52 wt. % of propene monomer units. The percentage of propene monomer units may be determined by a suitable method, such as nuclear magnetic resonance or infrared spectroscopies, known to those of skill in the art.

The one or more copolymers can comprise from about 30 wt. % to about 70 wt. %, alternatively from about 35 wt. % to about 65 wt. %, alternatively from about 40 wt. % to about 60 wt. %, alternatively from about 45 wt. % to about 60 wt. %, alternatively from about 45 wt. % to about 55 wt. %, alternatively from about 50 wt. % to about 60 wt. %, alternatively from about 54 wt. % to about 56 wt. %, and alternatively from about 48 wt. % to about 52 wt. % of 1-butene monomer units. The percentage of 1-butene monomer units may be determined by a suitable method, such as nuclear magnetic resonance or infrared spectroscopies, known to those of skill in the art.

The one or more copolymers can comprise from about 1 wt. % to about 40 wt. %, alternatively from about 2 wt. % to about 30 wt. %, alternatively from about 5 wt. % to about 20 wt. %, and alternatively from about 5 wt. % to about 15 wt. % of one or more comonomer units selected from the group consisting of ethylene, 4-methyl-1-pentene, pentene-1,2-methylpentene-1,3methylbutene-1, heptene-1, dimethylpentene-1, trimethylbutene-1, ethylpentene-1, methylpentene-1, trimethylpentene-1, methylethylpentene-1, diethylbutene-1, propylpentane-1, decene-1, methylnonene-1, nonene-1, trimethylheptene-1, methylethylbutene-1, dodecene-1, and hexadodecene-1, and combinations thereof.

The one or more copolymers can comprise a first copolymer and a second copolymer. The adhesive composition can comprise from about 35 wt. % to about 80 wt. %, alternatively from about 45 wt. % to about 70 wt. %, alternatively from about 40 wt. % to about 75 wt. %, alternatively from about 55 wt. % to about 65 wt. %, alternatively from about 40 wt. % to about 55 wt. %, and alternatively from about 50 wt. % to about 60 wt. % of the first copolymer. The adhesive composition can comprise from about 5 wt. % to about 40 wt. %, alternatively from about 10 wt. % to about 35 wt. %, alternatively from about 15 wt. % to about 30 wt. %, alternatively from about 20 wt. % to about 25 wt. %, and alternatively from about 10 wt. % to about 45 wt. % of the second copolymer.

The one or more copolymers can be prepared by the methods described in U.S. Pat. Nos. 5,302,675 and 5,723,546, which are both expressly incorporated herein. The copolymer may be prepared using a single-site catalyst system, multiple single-site catalyst systems, or Ziegler Natta catalyst system. Monomers used to prepare the copolymer can be obtained from one or more carbon-based sources, e.g., biomass from animal and/or vegetable fats. The monomers can also be obtained from renewable feed stocks provided by, e.g., Neste's Rotterdam Refinery (Neste, Finland). Adhesive compositions comprising the copolymer can be prepared by combining the copolymer and at least one optional ingredient (e.g., an optical brightener, other copolymers), if desired. The copolymer can be prepared into a final adhesive composition product by heating the primary copolymer to elevated temperatures (e.g., about 135 to about 175° C.) that melts the copolymer. Once molten, one or more optional ingredients (e.g., additive or other polymers components) can be added to the primary copolymer. A mixer can be used to mix the components together into a final adhesive composition.

The one or more copolymers can be selected from REXtac$^R$ copolymers 2815, 2715, 2788, 2730, and 2830. See, for example, Sustic, U.S. Pat. No. 5,723,546, which is expressly incorporated by reference, for a description of additional exemplary copolymers.

The adhesive composition can comprise from about 10 wt. % to about 30 wt. %, alternatively from about 15 wt. % to about 25 wt. %, alternatively from about 20 wt. % to about 60 wt. %, alternatively from about 20 wt. % to about 50 wt. %, alternatively from about 25 wt. % to about 55 wt. %, alternatively from about 30 wt. % to about 40 wt. %, and alternatively from about 25 wt. % to about 35 wt. % of one or more heterophase copolymers.

The one or more heterophase copolymers can comprise a first heterophase copolymer and a second heterophase copolymer. The adhesive composition can comprise from about 2 wt. % to about 18 wt. %, alternatively from about 5 wt. % to about 15 wt. %, alternatively from about 10 wt. % to about 25 wt. %, alternatively from about 15 wt. % to about 20 wt. %, and alternatively from about 8 wt. % to about 12 wt. % of the first heterophase copolymer. The adhesive composition can comprise from about 2 wt. % to about 18 wt. %, alternatively from about 5 wt. % to about 15 wt. %, alternatively from about 10 wt. % to about 25 wt. %, alternatively from about 15 wt. % to about 20 wt. %, and alternatively from about 8 wt. % to about 12 wt. % of the second heterophase copolymer. The first heterophase copolymer can have a higher or lower Enthalpy of Fusion than the second heterophase copolymer, as measured by the Enthalpy of Fusion Test Method described herein.

The one or more heterophase copolymers may be made using one or more metallocene catalyst blends that obtain a desired heterophase structure.

The one or more heterophase copolymers can include propene monomer units and/or one or more $C_2$ or $C_{4-20}$ α-olefin monomer units. The one or more heterophase copolymers can comprise from about 99.5 wt. % to about 70 wt. %, or about 95 to about 75 wt. % of propene monomer units. In addition to propene monomer units, the one or more heterophase copolymers can comprise from about 0.1 wt. % to 30 wt. %, or from about 5 wt. % to 25 wt. % of $C_{2, 4}$ or $C_{5-10}$ alpha-olefin monomer units.

The one or more heterophase copolymers can comprise amorphous blocks and crystalline blocks for providing good cohesive strength in the adhesive composition.

Possible examples of the one or more heterophase copolymers can include polyolefins such as polyethylene, polypropylene, and copolymers thereof, such as metallocene-technology based propylene-ethylene copolymers sold by Clariant under the trade name Licocene™, such as Licocene PP-1302 and Licocene PP-2502. Other suitable heterophase copolymers can include polypropylene-based elastomers and polyolefin elastomers described in U.S. Pat. No. 8,865,824, which is incorporated herein by its entirety. The one or more heterophase copolymers can also include heterophasic polypropylene homopolymers (e.g., L-MODU), supplied by Idemitsu Kosan.

Known methods of polymerization and synthesis processes can used to prepare the one or more heterophase copolymers. For example, metallocene catalysts or Zeigler-Natta catalysts may be used for polymerization of an olefin monomer or monomer mixture of the one or more heterophase copolymers, as described in U.S. Pat. No. 8,865,824, which is incorporated herein by its entirety.

The adhesive composition can comprise less than 20 wt. %, alternatively less than 10 wt. %, alternatively less than 5 wt. %, alternatively less than 3 wt. %, alternatively less than 2 wt. %, and alternatively less than 1 wt. %, alternatively less than 0.5 wt. %, and alternatively less than 0.1 wt. % of a tackifier. Exemplary tackifiers can include aliphatic hydrocarbon resins, aromatic modified aliphatic hydrocarbon resins, hydrogenated poly-cyclopentadiene resins, poly-cyclopentadiene resins, gum rosins, gum rosin esters, wood rosins, wood rosin esters, tall oil rosins, tall oil rosin esters, poly-terpenes, aromatic modified poly-terpenes, terpene-phenolics, aromatic modified hydrogenated poly-cyclopentadiene resins, hydrogenated aliphatic resins, hydrogenated aliphatic aromatic resins, hydrogenated terpenes and modified terpenes, and hydrogenated rosin esters.

The adhesive composition can be free of a tackifier. There are significant advantages to minimizing or avoiding the use of a tackifier as it may reduce the cost of the adhesive composition, as well as eliminate an additional ingredient and potential issues that may be associated with supplying the additional ingredient. Furthermore, tackifiers can impart undesirable odor in disposable articles and can also act as carriers of low molecular weight plasticizers (e.g., process oils that are used in SBC based adhesives) that can weaken the polyethylene back sheet materials used in absorbent articles and textile articles.

The adhesive composition can be free of polyisobutylene. The adhesive composition can comprise less than 10 wt. %, alternatively less than 5 wt. %, alternatively less than 3 wt. %, alternatively less than 2 wt. %, and alternatively less than 1 wt. %, alternatively less than 0.5 wt. %, and alternatively less than 0.1 wt. % of polyisobutylene.

Adhesive Composition Properties

The copolymer, as well as adhesive compositions comprising the copolymer, can have a viscosity of from about 2,000 mPa·s to about 11,500 mPa·s, alternatively from about 3,000 mPa·s to about 8,500 mPa·s, alternatively from about 4,000 mPa·s to about 6,500 mPa·s, alternatively from about 4,500 mPa·s to about 6,000 mPa·s, alternatively from about 5,000 mPa·s to about 5,500 mPa·s, alternatively less than 7,500 mPa·s, and alternatively less than 6,500 mPa·s at 150° C., as measured by the Viscosity Test Method described herein.

The copolymer, as well as adhesive compositions comprising the copolymer, can have a rheology and thermal stability suitable for use with conventional hot melt adhesive application equipment. The copolymer, as well as adhesive compositions comprising the copolymer, having a desired viscosity at the application temperature, can facilitate flow of the copolymer, as well as adhesive compositions comprising the copolymer, through a coating apparatus, e.g., a coating die or a spray nozzle.

Desirable viscosity values can be useful for ensuring that the copolymer, as well as adhesive compositions comprising the copolymer, is compatible with adhesive application methods and equipment. For example, a viscosity value that is too high may not be compatible with certain application methods and equipment, e.g., spraying methods and nozzles.

The copolymer, as well as adhesive compositions comprising the copolymer, can have an Enthalpy of Fusion at 1° C./min cooling rate of less than 17 J/g, alternatively less than 16.5 J/g, alternatively less than 16 J/g, alternatively from about 6.5 J/g to 17 J/g, alternatively from about 7 J/g to about 16.5 J/g, alternatively from about 8 J/g to about 16 J/g, alternatively from about 8.7 J/g to about 15.8 J/g, and alternatively from about 10 J/g to about 16 J/g, as measured by the Enthalpy of Fusion Test Method described herein.

The copolymer, as well as adhesive compositions comprising the copolymer, can have a Tensile Strength at Yield of from about 0.5 MPa to about 1.5 MPa, alternatively from about 0.7 MPa to about 1.4 MPa, alternatively from about 0.8 MPa to about 1.35 MPa, alternatively from about 0.9 MPa to about 1.3 MPa, and alternatively from about 0.95 MPa to about 1.25 MPa, as measured by the Tensile Strength Test Method described herein. In some applications, a Tensile Strength at Yield value that is too low may indicate that the copolymer, as well as adhesive compositions comprising the copolymer, is too week and will not provide sufficient tensile strength for a product during use. Alternatively, in some applications, a Tensile Strength at Yield value that is too high may indicate that the copolymer, as well as adhesive compositions comprising the copolymer, is too stiff and cannot sufficiently absorb the stresses applied to the copolymer, as well as adhesive compositions comprising the copolymer, during product use.

The copolymer, as well as adhesive compositions comprising the copolymer, can exhibit surprisingly high values in the Static Peel Time Test Method described herein, as shown in Table 2 below. The copolymer, as well as adhesive compositions comprising the copolymer, can have a Static Peel Time of at least 220 seconds, alternatively at least 230 seconds, alternatively from about 220 seconds to about 750 seconds, alternatively from about 225 seconds to about 600 seconds, alternatively from about 230 seconds to about 500 seconds, and alternatively from about 230 seconds to about 400 seconds, and alternatively from about 235 seconds to about 350 seconds, when performed using a 25-gram weight and a 40-mm wide test sample having a coat weight of about 2.2 gsm, as measured by the Static Peel Time Test Method described herein.

The copolymer, as well as adhesive compositions comprising the copolymer, can have a Needle Penetration of from about 10 decimillimeters to about 35 decimillimeters, alternatively from about 15 decimillimeters to about 30 decimillimeters, and alternatively from about 17 decimillimeters to about 21 decimillimeters, as measured by the Needle Penetration Test Method described herein. In some applications, a Needle Penetration value that is too high may indicate that the copolymer, as well as adhesive compositions comprising the copolymer, is too soft and will not provide sufficient bond strength for a product, leading to a cohesive failure of the adhesive composition in the bond. Alternatively, in some applications, a Needle Penetration that is too low may indicate that the copolymer, as well as adhesive compositions comprising the copolymer, is too stiff and cannot sufficiently absorb the stresses applied to the copolymer, as well as adhesive compositions comprising the copolymer, during product use.

The copolymer, as well as adhesive compositions comprising the copolymer, can have a density of from about 0.4 g/cm$^3$ to about 0.87 g/cm$^3$, alternatively from about 0.5 g/cm$^3$ to about 0.85 g/cm$^3$, alternatively from about 0.7 g/cm$^3$ to about 0.85 g/cm$^3$, alternatively from about 0.75 g/cm$^3$ to about 0.85 g/cm$^3$, and alternatively from about 0.8 g/cm$^3$ to about 0.85 g/cm$^3$ at 150° C.

The copolymer, as well as adhesive compositions comprising the copolymer, can have a Storage Modulus at 37° C. of from about 3 MPa to about 9.5 MPa, alternatively from about 4.5 MPa to about 9.5 MPa, alternatively from about 5 MPa to about 9.25 MPa, and alternatively from about 5.5 MPa to about 9.1 MPa, as measured by the Oscillatory Rheometry Test described herein.

The copolymer, as well as adhesive compositions comprising the copolymer, can have a Yield Stress at 37° C. of from about 0.8 MPa to about 1.45 MPa, alternatively from about 0.9 MPa to about 1.4 MPa, alternatively from about 1 to about 1.4 MPa, as measured by the Extensional Test Method described herein.

The copolymer, as well as adhesive compositions comprising the copolymer, can have a Toughness at 37° C. of from about 2 MJ/m$^3$ to about 5 MJ/m$^3$, alternatively from about 2 MJ/m$^3$ to about 4 MJ/m$^3$, and alternatively from about 2.4 MJ/m$^3$ to about 4 MJ/m$^3$, as measured by the Extensional Test Method described herein.

Optional Ingredients

The adhesive composition described herein can comprise less than 10 wt. %, alternatively less than 5 wt. %, alternatively less than 3 wt. %, alternatively less than 2 wt. %, alternatively less than 1 wt. %, alternatively less than 0.5 wt. %, alternatively less than 0.3 wt. %, alternatively less than 0.2 wt. %, alternatively less than 0.1 wt. %, and alternatively less than 0.05 wt. % of one or more optional ingredients.

The adhesive composition can optionally include a plasticizer or plasticizing oil or extender oil that may reduce the viscosity or improve tack properties in the adhesive composition. Nonlimiting examples of plasticizers include olefin oligomers, low molecular weight polyolefins such as liquid polybutenes, low molecular weight non-aromatic polymers (e.g. REGALREZ 101 from Eastman Chemical Company), phthalates, mineral oils such as naphthenic, paraffinic, or hydrogenated (white) oils (e.g. Kaydol oil or ParaLux oils (Chevron U.S.A. Inc.)), vegetable and animal oils and their derivatives, petroleum derived oils, and combinations thereof. The plasticizers can include polypropylene, polybutene, hydrogenated polyisoprene, hydrogenated polybutadiene, polypiperylene, copolymers of piperylene and isoprene, as described in U.S. Pat. No. 8,865,824, which is expressly incorporated by reference.

The adhesive composition can optionally include an antioxidant or a stabilizer. Any antioxidant known to a person of ordinary skill in the art may be used in the adhesion composition. Non-limiting examples of suitable antioxidants include amine-based antioxidants such as alkyl diphenyl amines, phenyl-naphthylamine, alkyl or aralkyl substituted phenyl-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetra kis [(methylene(3,5-di-t-butyl-4-hydroxyhydrocinnamate)]methane (e.g., IRGANOX™ 1010, from Ciba Geigy, New York); octadecyl-3,5-di-t-butyl-4-hydroxycinnamate (e.g., IRGANOX™ 1076, commercially available from Ciba Geigy) and combinations thereof. Where used, the amount of the antioxidant in the composition can be less than 1 wt. %, alternatively from about 0.05 wt. % to about 0.75 wt. %, and alternatively from about 0.1 wt. % to about 0.5 wt. % of the total weight of the adhesive composition.

The adhesive composition can optionally include a UV stabilizer that may prevent or reduce the degradation of the composition by radiation. Any UV stabilizer known to a person of ordinary skill in the art may be used in the adhesion composition. Non-limiting examples of suitable UV stabilizers include benzophenones, benzotriazoles, aryl esters, oxanilides, acrylic esters, formamidine carbon black, hindered amines, nickel quenchers, hindered amines, phenolic antioxidants, metallic salts, zinc compounds, and combinations thereof. Where used, the amount of the UV stabilizer in the adhesive composition can be less than 1 wt. %, alternatively from about 0.05 wt. % to about 0.75 wt. %, and alternatively from about 0.1 wt. % to about 0.5 wt. % of the total weight of the adhesive composition.

The adhesive composition can optionally include a brightener, colorant, and/or pigment. Any colorant or pigment known to a person of ordinary skill in the art may be used in the adhesive composition. Non-limiting examples of suitable brighteners, colorants, and/or pigments include fluorescent materials and pigments such as triazine-stilbene, coumarin, imidazole, diazole, titanium dioxide and carbon black, phthalocyanine pigments, and other organic pigments such as IRGAZINB, CROMOPHTALB, MONASTRALB, CINQUASIAB, IRGALITEB, ORASOLB, all of which are available from Ciba Specialty Chemicals, Tarrytown, N.Y. Where used, the amount of the brightener, colorant, and/or pigment in the adhesive composition can be less than 10 wt. %, alternatively from about 0.01 wt. % to about 5 wt. %, and alternatively from about 0.1 wt. % to about 2 wt. % of the total weight of the adhesive composition.

The adhesive composition can optionally include a fragrance such as a perfume or other odorant. Such fragrances may be retained by a liner or contained in release agents such as microcapsules that may, for example, release fragrance upon removal of a release liner from or compression on the adhesive composition.

The adhesive composition can optionally include a filler. Any filler known to a person of ordinary skill in the art may be used in the adhesive composition. Non-limiting examples of suitable fillers include sand, talc, dolomite, calcium carbonate, clay, silica, mica, wollastonite, feldspar, aluminum silicate, alumina, hydrated alumina, glass bead, glass microsphere, ceramic microsphere, thermoplastic microsphere, barite, wood flour, and combinations thereof. Where used, the amount of the filler in the adhesive composition can be less than 60 wt. %, alternatively from about 1 wt. % to about 50 wt. %, and alternatively from about 5 wt. % to about 40 wt. % of the total weight of the adhesive composition.

Applications

The adhesive compositions described herein have industrial applications in sanitary disposable consumer articles, for example, diapers, feminine care pads, and napkins. Articles can include items having any two or more substrates adhesively bonded by a hot melt adhesive composition, such as disposable articles such as diapers or feminine napkins. The substrates can include thermoplastics, thermoset polymers, polyesters, polyethylene terephthalate, polyamides, nylons, polypropylene, and combinations, blends, or layered composites thereof. The substrates can include, in some applications, coatings of wax, acrylate polymers, or other materials, colorants, preservatives, stabilizers, processing lubricants, and combinations thereof. The substrates can include solid, nonporous or breathable films. The substrates can include nonwoven fabrics and films (e.g., polyethylene films), in some applications.

The adhesive compositions can be used as a construction adhesive in assembly of commonly available consumer disposal articles. Such articles include infant diapers, adult diapers, bed pads, sanitary products, and other absorbent articles. Combining at least a polymer film with other films and fibrous materials typically makes these articles. Fibrous materials can include fabrics such as woven or nonwoven fabrics, fibers in the form of fiber vats, fiber collections, fiber balls, etc.

Such absorbent articles typically include an absorbent held within the article. The absorbent is usually covered using a nonwoven inner liner. Such liners include a highly permeable material such as a spun bonded nonwoven structure that passes fluids or moisture from the interior of the article into the absorbent layer. The absorbent layer or structure formed within the absorbent article typically includes a fiber mass pad or cellulosic or wood pulp for the purpose of absorbing liquid or fluid materials released into the absorbent article. The fiber or fluff can include a cellulosic fiber, a synthetic fiber or mixtures thereof such as blends of wood fiber, cellulosic fiber, polyethylene fiber, polypropene fiber or other fiber materials often including a super absorbent material. Super or highly absorbent materials are used to increase the absorptive capacity of the absorbent article. Such materials are organic materials including modified natural gums and resins but often include synthetic polymer materials such as hydrogels. Carboxymethyl cellulose, alkaline metal salts of acrylic polymers, polyacrylamides, polyvinyl alcohol, polyethylene anhydride polymers and copolymers, polyvinyl ether polymers and copolymers, hydroxyalkyl cellulose polymers and copolymers, polyvinyl sulfonic acid polymers and copolymers, polyacrylic polymers, polyvinyl-pyrrolidone polymers and copolymers can be used in the absorbent function.

Nonwoven fabric layers used in such disposal articles typically are generally planar structures including a bonded assembly of natural or synthetic fiber.

Such nonwoven materials are often made using a variety of techniques, including spun bonding, melt bonding, etc. Such nonwoven materials are often manufactured by randomly placing fibers or rovings in a random pattern and are then thermally bonded using inherent bonding characteristics of the fibers or by bonding the fibers using resin materials applied to the fibers. Various polymers can be used to make nonwoven materials including poly olefins, polyesters, ethylene vinyl acetate polymers, ethylene acrylic acid polymers and others.

The exterior of the article often includes a polymer film that is liquid impervious. In certain aspects exterior polymer films can be further modified using additional exterior layers to obtain a more cloth like or nonwoven character to the exterior polymer film. The exterior film typically includes a single layer of a polymer film but can be a multi-layer film structure. Typical polymer sheet materials include high tensile strength polymers including polyesters, poly olefins or other thermoplastic sheet materials that can be formed into film layers. The polyolefin or polyester polymer materials are often formed into sheets and are treated to improve strength, flexibility and puncture resistance. Techniques including biaxial orientation, heat treatment or surface treatment can improve the film characteristics of the polymer films. Such polymer films often have a thickness that ranges from about 0.5 mils (i.e., one thousandth of an inch) to about 1.5 mils.

The absorbent articles can include a liquid impervious polymer film, an absorbent layer pad and a nonwoven interior layer. A three component structure can be assembled using the adhesive composition that is applied using manufacturing techniques that adheres the nonwoven interior layer to the polymer film while holding the absorbent layer there between.

Methods of manufacture employing the adhesive compositions include the application of the molten adhesive compositions to a substrate, followed by contact of the adhesive composition with a second substrate within 0.1 second to 5 seconds after application of the adhesive composition to the first substrate, wherein the contacting results in an adhesive bond between the substrates.

In the articles manufactured using the adhesive compositions, the articles can be manufactured by forming an adhesive bond between a polymer film and a fiber or fiber mass. The article can also include an adhesive bond formed between a polymer film and a nonwoven fabric. Additionally the article can be manufactured by forming an adhesive bond between a multi-layer structure including the exterior layer of a polymer film and interior components including a fiber map or a nonwoven fabric.

The adhesive compositions can be applied under melt conditions to a substrate as a hot melt adhesive or may be coated, applied or sprayed onto the polymer film nonwoven or absorbent pad. Spray-on adhesives are typically applied using slot coat, spray on or atomizing character in a bead, dot pattern, spiral pattern or other conventional pattern using such Nordson application techniques. The adhesive composition can be applied to a substrate using a slot coat (using Nordson true coat or Speed coat slot) at increased machine speed.

The adhesive composition can be applied in an amount of about 1 to about 25 grams per square meter (g-m$^{-2}$) of resulting bonded material. The adhesive composition can be used for disposal diaper and napkin construction elastic attachment and disposal goods particularly preferred applications include baby diaper construction, diaper chassis construction, diaper core stabilization, diaper outer cover lamination, feminine napkin core stabilization, and feminine napkin construction bond.

Test Methods

Static Peel Time Test Method

The Static Peel Time of a hot melt adhesive composition is determined by using the Static Peel Time Test Method, which consists of first using the hot melt to create a bond between two specified substrates using a specified slot coating process to form a laminate, as described below. Specimens extracted from the substrates are then subjected to a 180-degree peel test under static load, and the average time to failure is reported as the "Static Peel Time."

Preparation of Laminate

Two specified substrates are affixed via a specified slot coating process using the hot melt adhesive composition to form a laminate. The first substrate used to form the laminate, the "nonwoven," is a 15 gsm polypropylene spunbond (SSS) with a point bond pattern (diamonds, 0.87 mm$^2$ per point bond) that covers 18.6% bond area and has 21.5 points per square centimeter. The average fiber diameter is 17 microns. The nonwoven is provided in roll stock form and is 212 mm in width. The second substrate used to form the laminate, the "film," is a microporous polyethylene film with basis weight of 16 gsm. The average print coverage area is 16.7%. Exemplary suitable films are MICROPRO microporous films, and films designated BR137P and BR137U, available from Clopay (Clopay Plastics Corporation, Mason, Ohio, USA), or equivalent. The film is provided in roll stock and is 206 mm in width.

The hot melt adhesive composition is slot coated onto the moving nonwoven web. The nonwoven web-speed is 573 m/min and the total nonwoven web tension at the point of application is 0.5 lbs (10.5 N/m tension per unit width). The adhesive is slot coated onto the nonwoven using a True-Coat™ die from Nordson (Nordson LU12K04139/8138208, Nordson Corporation, Westlake, Ohio, USA, or equivalent). The shim of the die is 0.3 mm thick and cut with an alternating pattern to create 60 openings, each 1 mm wide, with 1 mm wide spacings between each opening. This creates a coating of 60 continuous stripes of adhesive in the machine direction, each stripe of adhesive is 1 mm wide with a 1 mm uncoated spacing between adhesive stripes. The adhesive flow rate for the nozzle is set such that the basis weight of each adhesive stripe is 2.2±0.1 gsm. The adhesive is maintained at a temperature of 150±5° C. at all points up to and including the applicator. This overall slot coating process is performed at an ambient temperature of 21±2° C.

The adhesive is applied to the nonwoven web with the slot coat die by bringing the slot coat die into contact with the nonwoven supported between two non-driven web-support idlers that co-rotate with the moving nonwoven web and each have 57 mm diameter. The spacing of the web-support idlers is set to 155 mm, center to center, and the adhesive applicator's exit is set at a point 7 mm from the downstream idler's center. The applicator is pressed into the nonwoven between the idlers, such that the nonwoven is deflected 3-4 mm at the exit point of the adhesive from the slot coat die, with respect to the plane made by the nonwoven under tension when the applicator is absent. The angle made between the slot coat die's shim plane and the plane of the tensioned nonwoven when the applicator is not engaged, is the pitch angle. This angle is described to be zero when the planes are perpendicular to each other. For the laminates, the adhesive was coated with a positive 3° pitch angle towards the downstream idler. In other words, the plane of the shim relative to the plane of the tensioned nonwoven when the applicator is not engaged, is 87° on the side of the downstream idler. The adhesive coating is centered along the length of the nonwoven web by centering the width of the slot coat die on the width of the nonwoven.

The adhesive coated nonwoven web is then brought into contact with the film about 970 mm after coating. The web speed of the film is 573 m/min, and the total film's web tension is 1.0 lb (21 N/m, tension per unit width). The contact point between the two webs is made at a 57 mm diameter idler and the webs are wrapped around the idler with a 190° wrap angle. The combined web is wound on a roll with 1.5 lbs winding tension and samples are immediately cut off the roll after winding. The removed samples are allowed to equilibrate at 21±2° C. and 40% relative humidity for a minimum of 20 hours before static peel testing.

Peel Under Static Load

Specimens are removed at random from the equilibrated laminate. Specimens measure 40 mm in the machine direction of the laminate and across the entire cross direction of the laminate such that all sixty 1-mm wide stripes of slot-coated hot melt adhesive composition are included in the cross machine length of the strip.

The static peel is conducted in a direction transverse to the machine direction (e.g., perpendicular to the adhesive stripe direction). On one 40 mm wide edge of the laminate test specimen, each unbonded layer at the edge of the laminate is separately folded over a small round wooden dowel rod 2 mm in diameter and approximately 40 mm long, and the wrapped dowels are secured with a 2 inch wide bulldog clip. The clip is placed over the wrapped dowel and clamped onto the doubled layer of material such that the material does not slip or pull out of the clip. With clips attached, the test specimens are placed in preconditioned incubator (at 37±1° C.) for about 10 minutes before testing. After 10 minutes, each sample is suspended in the chamber by the clip attached to the film layer, and a weight is attached to the nonwoven's clip, hanging therefrom. The hanging weight, the bulldog clip, and the dowel have a total weight of 25 grams. The specimen is suspended such that the bottom of the attached weight is located high enough above the bottom of the chamber so that the entire laminate can peel apart and the weight can freely fall to the bottom of the chamber through some remaining distance. A timer is used to measure the time between the time at which the hanging weight is attached and the time at which the bonded area of the test laminate fully delaminates. For each specimen, this time to failure is recorded to the nearest second. The peel under static load is performed on at least ten specimens, and the arithmetic mean of the time to failure is defined as the "Static Peel Time," reported to the nearest second.

Needle Penetration Test Method

The Needle Penetration of a hot melt adhesive composition is determined using the Needle Penetration Test Method, which consists of performing ASTM D5/D5M-13 with a Humboldt H1280 needle and the following additional guidance. Ambient temperature is maintained at 21.5±1.0° C., and specimen(s) of hot melt adhesive composition to be tested are thermally equilibrated prior to measurement. A total load of 100 g as described in section 6 of ASTM D5/D5M-13 is used, and the allowed penetration time is 5.0±0.2 seconds. The arithmetic mean of the distance of needle penetration for three replicates, as described in section 10 of ASTM D5/D5M-13, is defined as the "Needle Penetration" and is reported in units of tenths of a millimeter (that is, decimillimeters, or dmm) to the nearest whole value in dmm.

Tensile Strength Test Method

The Tensile Strength of a hot melt adhesive composition is determined using the Tensile Strength Test Method, which consists of performing ASTM D638-14 with the following additional guidance. Ambient temperature is maintained at 23.0±1.0° C. Hot melt adhesive composition is cast into a shape consistent with a Type IV "dogbone" as described in FIG. 1 of ASTM D638-14 and allowed to equilibrate to ambient temperature. The test proceeds with a crosshead speed of 50 mm/min. Tensile Strength at Yield is calculated as described in section 11.2 of ASTM D638-14 and is reported as the "Tensile Strength at Yield" in units of megapascals (MPa) to the nearest 0.01 MPa.

Viscosity Test Method

The Viscosity Parameter of a hot melt adhesive composition is determined using the Viscosity Parameter Test Method, which consists of performing ASTM D3236-15 with the following additional guidance. A Brookfield RVT viscometer with spindle SC 4-27 (Brookfield Engineering, Middleboro, Mass., USA), or equivalent, is used. The sample temperature is maintained at 150.0±1.0° C. is throughout the measurement. The sample is preheated for 10 minutes and stirred with the measurement spindle for 30 min. The spindle is rotated at 20 rpm throughout the measurement. The resulting apparent viscosity, as described in section 10, is reported as the "viscosity" in units of millipascal-seconds to the nearest 100 mPa·s.

Mettler Cup and Ball Test Method

The Mettler Cup and Ball Parameter is determined using the Mettler Cup and Ball Test Method, which consists of performing ASTM D3461-14 with a heating rate of heating is 2° C./min. The softening point as defined in ASTM D3461-14 is recorded and reported to the nearest 0.1° C. as the Mettler Cup and Ball Parameter.

Enthalpy of Fusion Test Method

The Enthalpy of Fusion Parameter of a hot melt adhesive composition is determined using the Enthalpy of Fusion Test Method, which consists of performing ASTM D3418-15 with the following additional guidance. Specimen(s) are preferably extracted from molded or pelleted raw material adhesive composition. If raw material is not available, specimen(s) of adhesive are extracted from bonds of interest in an absorbent article using techniques known to those of skill in the art. Dry nitrogen is used as the purge gas in the differential scanning calorimeter (DSC). The rate of increase of temperature in the DSC is 10° C./min, and the rate of decrease of temperature in the DSC is 1° C./min. The mass-normalized enthalpy of fusion is calculated as specified in section 11.4 based on the curve corresponding to decreasing temperature (at 1° C./min) and is reported as the "Enthalpy of Fusion" in units of joules per gram (J/g) to the nearest 0.1 J/g.

Oscillatory Rheometry Test Method

The Oscillatory Rheometry Test Method is used to measure the Storage Modulus and the Loss Factor of a hot melt adhesive composition. A controlled-stress rotational rheometer (such as Discovery HR-3, TA Instruments, New Castle, Del., USA, or equivalent) capable of sample temperature control (using a Peltier cooler and resistance heater combination) with a precision equal to or exceeding 0.5° C. over at least the range of −10° C. to 150° C. The rheometer is operated in a parallel plate configuration with 20-mm stainless steel parallel-plate tooling.

A parallel plate gap of 1000 μm is initially used in the method. To compensate for thermal expansion of the tooling, the gap is set to 1000 μm, and a mapping of actual plate gap (as measured using a suitable standard test fluid) a function of temperature over the range −10° C. to 150° C. is performed. This mapping is then used throughout the determination of the Storage Modulus Parameter and the Loss Factor Parameter.

The rheometer is heated to 150° C., hot melt adhesive composition is introduced in the rheometer, the gap is set to 1050 μm, excess protruding sample is trimmed, and the gap is then set to 1000 μm. (The axial force control of the rheometer is set to be maintained within ±0.1 N of force, and the thermal expansion/contraction of the sample itself is compensated in order to avoid overfilling or underfilling of the gap in addition to the abovementioned compensation of the tooling.) The rheometer is then allowed to cool to 130° C., at which point the measurement commences with temperature ramped from 130° C. to −10° C. at a constant rate of cooling of 2° C./min. The applied strain amplitude is 0.1%, and the frequency of oscillation is 1 Hz (that is, one cycle per second). The resulting oscillatory stress is recorded.

After this step, the sample temperature is set to 23° C. (temperature is ramped to this setpoint at a rate of 10° C./min), and the sample is allowed to rest for 4.0 hours at 23° C. At the end of this period, the temperature is set to −10° C. (temperature is ramped to this setpoint at a rate of 10° C./min), the sample is equilibrated for 300 seconds at −10° C., and a second oscillatory rheology measurement is conducted (0.1% strain, frequency of oscillation of 1 Hz) while temperature is ramped upward to 130° C. at a constant rate of increase of 2° C./min.

From the second, increasing temperature sweep, the storage modulus G' is calculated and recorded at 23° C. and 37° C., and these values are reported in megapascals (MPa) to the nearest 0.01 MPa as the "Storage Modulus at 23° C." and the "Storage Modulus at 37° C.," respectively. From the second, increasing temperature sweep, the loss factor (also known as tan delta) is calculated recorded at 23° C. and 37° C., and these dimensionless values are reported to the nearest hundredth as the "Loss Factor at 23° C." and the "Loss Factor at 37° C.," respectively.

Extensional Test Method

The Extensional Test Method is used to determine the Yield Stress and the Toughness for a specimen of an adhesive composition. A thin film specimen formed of adhesive composition is analyzed with a rotational rheometer fitted with a specialized fixture with counter rotating rollers, and the stress associated with extensional strain imparted is measured and recorded.

Instrumental Setup

A rotational rheometer (ARES G2, TA Instruments, New Castle, Del., USA, or equivalent) is fitted with a fixture that has counter rotating cylindrical rollers specifically designed for the interrogation of extension deformation of films. An example of a suitable fixture is the Extensional Viscosity Fixture, or EVF (EVF, TA Instruments, or equivalent). The rheometer is further fitted with a forced-convection oven FCO (FCO, TA Instruments, or equivalent) and cooling system (ACS 2, TA Instruments, or equivalent) capable of controlling temperate from at least −50 to 250° C. to a within a tolerance of 0.5° C.

Specimen Preparation

Approximately 10 g of the adhesive composition is placed in a polytetrafluoroethane (PTFE) bowl and introduced into a vacuum oven. After 15 minutes at 170° C. at ambient pressure, the pressure is lowered to 10 mbar, and the adhesive composition is subsequently held at 170° C. and at 10 mbar for 45 minutes to remove air bubbles from the adhesive composition. The adhesive composition is removed from the vacuum oven and allowed to cool to ambient lab conditions (23±2° C.) for 90±30 minutes, at which point the adhesive composition is removed from the PTFE bowl and placed between 2 sheets of siliconised paper. A metal shim 0.50 mm in thickness is used in the heated press as a spacer to obtain a film thickness of 0.50 mm when pressed with a heated press at 90° C. for 60 seconds at a pressure sufficient to form a polymeric film. If 90° C. is insufficient to melt the adhesive composition, a higher temperature (but the lowest temperature sufficient to melt the composition) is used. The film is stored at least 120 hours in the laboratory at 23±2° C. prior to testing. From the film individual specimens for measurement are punched with a sample cutter to the final specimen dimensions of 20.0 mm by 10.0 mm by 0.50 mm.

Measurement

The cylinders of the EVF are heated to 50° C. for 90±30 s in the forced-convection oven of the rheometer. A specimen of adhesive composition is quickly pressed onto the cylinders of the EVF to fix it to the cylinder surface. The specimen is placed perpendicular to the axis of rotation of the cylinders.

The specimen mounted on the EVF is then placed in the forced convection oven of the rheometer for thermal conditioning and is kept isothermal at 37±1° C. for 300±10 s. After this time has elapsed, the specimen is mechanically conditioned. To mechanically condition the specimen, the torque transducer is zeroed, and the sample is put under a pre-stretch rate of 0.001 s$^{-1}$ for 0.30 s and then allowed to relax for 60 s. (In this method, all strain is expressed in terms of Hencky strain, also known as "true strain" or "logarithmic strain.")

The measurement is performed in the FCO oven at 37° C.±0.5° C. The strain rate extension for the measurement is 1 s$^{-1}$, and the strain at maximum extension is 4.0. After measurement, the specimen is checked for rupturing. If it has ruptured, the location of the break is noted. If the rupture is approximately in the middle between the two cylinders of the EVF, the data collected are deemed acceptable. Otherwise, if the polymeric film break is at or close to the rotating cylinders, the results are discarded and the measurement performed again on a replicate specimen.

Analysis

For the extensional stress calculation, a constant volume is assumed. From the raw torque versus angular displacement data recorded by the rheometer, extensional stress (in megapascals, or MPa) versus Hencky strain data are calculated. The data are plotted in semilogarithmic fashion with Hencky strain on the abscissa (linear scale) and extensional stress on the ordinate (logarithmic scale). A linear range is sought in this plot. If a linear range can be identified and this range can be fit with a positive slope with an R$^2$ value of 0.98 or greater, the value of the fitted line at a Hencky strain of zero (that is, the y-intercept), is defined as the Yield Stress, which is reported in Mpa to the nearest kilopascal. Otherwise, the maximum value of extensional stress recorded during the measurement is reported as the Yield Stress, again reported in Mpa to the nearest kilopascal.

The extensional stress (MPa) versus Hencky strain data calculated above are again plotted, but this time in linear fashion with Hencky strain on the abscissa (linear axis) and extensional stress on the ordinate (linear axis). The integral of extensional stress with strain (that is, the area under the extensional stress curve as a function of strain) is calculated from a strain of zero to the strain at which the sample ruptured (or, in the case it did not rupture during the measurement, to a strain of 4.0) and is reported as the Toughness, which is reported in units of megajoules per cubic meter, or MJ m$^{-3}$.

EXAMPLES

The following examples are provided to help illustrate the adhesive composition herein. The exemplified adhesive compositions may be prepared by conventional formulation and mixing techniques. It will be appreciated that other modifications of the adhesive compositions described herein within the skill of those in the formulation art may be undertaken. All parts, percentages, and ratios herein are by weight unless otherwise specified. Some components may come from suppliers as dilute solutions. The amount stated reflects the weight percent of the active material, unless otherwise specified.

Table 1 provides exemplary adhesive compositions, wherein descriptions of the components and amount ranges of the components are shown. Copolymers A, B, C and D are amorphous copolymers of 1-butene monomer units and propene monomer units. Heterophase Copolymer A and Heterophase Copolymer B are heterophase copolymers of ethylene monomer unit and propene monomer units.

TABLE 1

| Component | Adhesive Composition A Wt. % | Adhesive Composition B Wt. % | Adhesive Composition C Wt. % |
| --- | --- | --- | --- |
| Copolymer A (REXtac RT2715) | 20 | — | 50 |
| Copolymer B (ex. REXtac) | 60 | — | — |
| Copolymer C (ex. REXtac) | — | 65 | — |
| Copolymer D (REXtac RT2788) | — | — | 30 |
| Heterophase Copolymer A (Clariant Licocene PP2502) | 10 | — | — |
| Heterophase Copolymer B (Clariant Licocene PP1302) | 10 | 35 | 20 |

Data

Table 2 shows exemplary and comparative adhesive compositions.

TABLE 2

| | Melt Viscosity @ 150° C. (mPa · s) | Enthalpy of Fusion (J/g) | Static Peel Test Performance (seconds) | Tensile Strength at Yield (MPa) | Spray Pattern |
|---|---|---|---|---|---|
| Adhesive Composition A | 3600 | 14.0 | 395 | 1.28 | Acceptable |
| Adhesive Composition B | 4000 | 8.7 | 426 | 1.08 | Acceptable |
| Adhesive Composition C | 5475 | 12.8 | 483 | 0.93 | Acceptable |
| Copolymer A (REXtac RT2715) | 3900 | 5.2 | 135 | 0.28 | Unacceptable |
| Copolymer E (REXtac RT2730) | 8200 | 6.0 | 214 | 0.31 | Unacceptable |
| Copolymer F (REXtac RT2830) | 8200 | 19.7 | 52 | 2.41 | Unacceptable |

During some testing, less than 1% of antioxidants and other minor ingredients were added for preservation and packaging purposes, but it is believed that the 1% of antioxidants and the other minor ingredients had no effect on the provided data in Table 2.

The spray pattern is assessed using the method disclosed in US 20040081795 A1, which is incorporated herein in its entirety. In US 20040081795 A1, the spray pattern was deemed acceptable if a good spiral pattern as that depicted in FIG. 1b was observed; otherwise, it was deemed unacceptable (FIG. 1a).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any application disclosed or claimed herein or that it alone, or in any combination with any other reference or references, teaches, suggests or discloses any such application. Further, to the extent that any meaning or definition of a term in this document conflicts with any meaning or definition of the same term in a document incorporated by reference, the meaning or definition assigned to that term in this document shall govern.

While particular embodiments of the adhesive composition have been illustrated and described, it would be obvious to those skilled in the art that various other changes and modifications may be made without departing from the spirit and scope of this document. It is therefore intended to cover in the appended claims all such changes and modifications that are within the scope of this document.

What is claimed is:

1. An adhesive composition comprising:
   (a) from about 70 wt. % to about 90 wt. % of one or more amorphous copolymers, wherein the one or more amorphous copolymers comprise (i) from about 30 mole % to about 70 mole % of monomer units selected from the group consisting of ethylene, 1-butene, and mixtures thereof; and (ii) from about 30 mole % to about 70 mole % of propene monomer units;
   (b) from about 10 wt. % to about 30 wt. % of heterophase copolymers;
   (c) wherein the adhesive composition is free of polyisobutylene;
   (d) wherein the adhesive composition has a viscosity of from about 2,000 mPa·s to about 11,500 mPa·s at 150° C., as measured by the Viscosity Test Method;
   (e) wherein the heterophase copolymers comprise a first heterophase copolymer and a second heterophase copolymer;
   (f) wherein the adhesive composition comprises from about 5 wt. % to about 15 wt. % of the first heterophase copolymer and from about 5 wt. % to about 15 wt. % of the second heterophase copolymer; and
   (g) wherein the first heterophase copolymer has a higher Enthalpy of Fusion than the second heterophase copolymer, as measured by the Enthalpy of Fusion Test Method.

2. The adhesive composition of claim 1, wherein adhesive composition has a Static Peel Time of at least 220 seconds, as measured by the Static Peel Time Test Method.

3. The adhesive composition of claim 1, wherein the adhesive composition has an Enthalpy of Fusion of less than 15 J/g.

4. The adhesive composition of claim 1, wherein the viscosity of the adhesive composition is less than 7,000 mPa·s at 150° C.

5. The adhesive composition of claim 1, wherein the viscosity of the adhesive composition is from about 4,000 mPa·s to about 6,500 mPa·s at 150° C.

6. The adhesive composition of claim 1, wherein at least one of the one or more amorphous copolymers comprises from about 30 wt. % to about 70 wt. % 1-butene monomer units.

7. The adhesive composition of claim 1, wherein the adhesive composition is free of a tackifier.

8. The adhesive composition of claim 1, wherein the adhesive composition has a density of from about 0.5 g/cm³ to 0.85 g/cm³ at 150° C.

9. The adhesive composition of claim 1, wherein the one or more amorphous copolymers comprise a first amorphous copolymer and a second amorphous copolymer, and wherein the adhesive composition comprises from about 35 wt. % to about 80 wt. % of the first amorphous copolymer and from about 10 wt. % to about 35 wt. % of the second amorphous copolymer.

10. An adhesive composition comprising:
    (a) from about 50 wt. % to about 80 wt. % of amorphous copolymers, wherein the amorphous copolymers comprise (i) from about 30 mole % to about 70 mole % of monomer units selected from the group consisting of ethylene, 1-butene, and mixtures thereof; and (ii) from about 30 mole % to about 70 mole % of propene monomer units;

(b) from about 20 wt. % to about 50 wt. % of one or more heterophase copolymers;

(c) wherein the adhesive composition is free of polyisobutylene;

(d) wherein the adhesive composition has a viscosity of from about 2,000 mPa·s to about 11,500 mPa·s at 150° C., as measured by the Viscosity Test Method;

(e) wherein the adhesive composition has an Enthalpy of Fusion of less than 15 J/g, as measured by the Enthalpy of Fusion Test Method; and (f) wherein the amorphous copolymers comprise a first amorphous copolymer and a second amorphous copolymer, and wherein the adhesive composition comprises from about 40 wt. % to about 75 wt. % of the first amorphous copolymer and from about 5 wt. % to about 40 wt. % of the second amorphous copolymer.

11. The adhesive composition of claim 10, wherein the adhesive composition has a Static Peel Time of at least 220 seconds, as measured by the Static Peel Time Test Method.

12. The adhesive composition of claim 10, wherein the one or more heterophase copolymers comprises a first heterophase copolymer and a second heterophase copolymer; wherein the adhesive composition comprises from about 10 wt. % to about 25 wt. % of the first heterophase copolymer and from about 10 wt. % to about 25 wt. % of the second heterophase copolymer; and wherein the first heterophase copolymer has a higher Enthalpy of Fusion than the second heterophase copolymer, as measured by the Enthalpy of Fusion Test Method.

13. The adhesive composition of claim 10, wherein the viscosity of the adhesive composition is from about 2,000 mPa·s to about 7,000 mPa·s at 150° C.

14. The adhesive composition of claim 10, wherein the viscosity of the adhesive composition is from about 4,000 mPa·s to about 6,500 mPa·s at 150° C.

15. The adhesive composition of claim 10, wherein the amorphous copolymers comprise from about 30 wt. % to about 70 wt. % 1-butene monomer units.

16. The adhesive composition of claim 10, wherein the adhesive composition is free of a tackifier.

17. The adhesive composition of claim 10, wherein the adhesive composition has a density of from about 0.5 g/cm³ to 0.85 g/cm³ at 150° C.

18. An adhesive composition comprising:
(a) from about 70 wt. % to about 90 wt. % of amorphous copolymers, wherein the amorphous copolymers comprise (i) from about 30 mole % to about 70 mole % of 1-butene monomer units; and (ii) from about 30 mole % to about 70 mole % of propene monomer units;

(b) from about 10 wt. % to about 30 wt. % of one or more heterophase copolymers;

(c) wherein the adhesive composition is free of polyisobutylene;

(d) wherein the adhesive composition has a viscosity of from about 2,000 mPa·s to about 11,500 mPa·s at 150° C., as measured by the Viscosity Test Method;

(e) wherein the adhesive composition has an Enthalpy of Fusion of less than 15 J/g, according to the Enthalpy of Fusion Test Method; and (f) wherein the amorphous copolymers comprise a first amorphous copolymer and a second amorphous copolymer, and wherein the adhesive composition comprises from about 35 wt. % to about 80 wt. % of the first amorphous copolymer and from about 10 wt. % to about 35 wt. % of the second amorphous copolymer.

19. The adhesive composition of claim 18, wherein the adhesive composition is free of a tackifier.

20. The adhesive composition of claim 18, wherein the adhesive composition has a density of from about 0.5 g/cm³ to 0.85 g/cm³ at 150° C.

* * * * *